Patented Apr. 18, 1950

2,504,903

UNITED STATES PATENT OFFICE 2,504,903

METHOD OF PLASTICIZING RUBBER

Bernard Miller Sturgis, Pitman, N. J., and John Joseph Verbanc, Wilmington, Del., assignors to E. I. du Pont de Nemours & Company, Wilmington, Del., a corporation of Delaware No Drawing. Application October 17, 1947, Serial No. 780,590

4 Claims. (Cl. 260—761)

This invention relates to rubber and more particularly to treating rubber to produce a more plastic product.

It is well known that rubber when subjected to mechanical working in the presence of air or oxygen is rendered more plastic. The degree of plasticization is determined to a great extent by the time and temperature of milling. When milled for a sufficient length of time, rubber becomes very soft and at the same time will lose much of its ability to vulcanize. In order to reduce the time of milling and to prevent the deteriorating action of continued milling, it is common practice to add to the rubber, during the milling operation, certain materials which assist in producing a more plastice and workable product. The materials which are commonly used are oils, esters, waxes, fats, alcohols, acids, resins and the like, which assist in the production of soft rubber either by a swelling action on the rubber or by acting as a lubricant. Some of the more common softeners are mineral oil, pine tar, palm oil, rosin oil, dibutyl phthalate, paraffin wax, glycerine and stearic acid. Relatively large amounts of these agents must be used to produce the desired plasticity. The presence of these so called "physical softeners" leads to the impairment of a number of the physical properties of the resulting vulcanizates and for this reason their use is often undesirable.

It is the object of the present invention to provide organic compositions which when added to rubber during processing will materially decrease the time necessary for breakdown of the rubber and will decrease the overall time necessary for addition of compounding agents. A further object is to provide organic compounds which when added to rubber will increase the plasticity of the raw product to produce better molding properties and superior extrusion characteristics. Another object is to produce rubber which may be milled at relatively low temperatures, 50 to 175° C., making design of new and costly equipment unnecessary. Further, it is the object of this invention to provide organic compositions which when added to cements will materially decrease the viscosity making possible the production of coating compositions of higher solids content. A still further object is to provide a method of plasticizing rubber which will not lead to inferior properties in the resulting vulcanizates. Further objects will appear hereinafter.

The above and other objects may be accomplished in accordance with our invention which comprises subjecting unvulcanized rubber to the action of 0.05% to 5% by weight based on the rubber of α-thienyl mercaptan (α-thiophene mercaptan), its corresponding disulfide which is α,α-dithienyl disulfide, its zinc salt, and its esters derived from carboxylic acids containing 1 to 8 carbon atoms. Among such carboxylic acids are formic, acetic, monochloroacetic, dichloroacetic, trichloroacetic, butyric, caprylic, benzoic, p-nitrobenzoic, o-chloro benzoic, furoic, oxylic, succinic, adipic, suberic, o-toluic, and phthalic acids.

These plasticizers may be produced by any methods known to those skilled in the art. By way of illustration, α-thienyl mercaptan may be made by reacting α-bromo-thiophene with magnesium in dry ether, treating the resulting Grignard reagent with free sulfur and decomposing the resulting magnesium salt of the mercaptan with acid. An analogous method for making thiophenols is described in Beilstein, vol. 6, page 294. The thienyl mercaptan derivatives used in the present invention may be made by methods analogous to those used with thiophenols. Thus the disulfide may be made from the mercaptan by gentle oxidation, the zinc salt by heating the mercaptan with zinc oxide in an alcoholic solvent, and the ester, for example, by treating the mercaptan with the appropriate acid chloride or anhydride.

The unvulcanized rubber is subjected to the action of the above compounds for a sufficient length of time for the said compounds to effect a marked decrease in the resistance of the rubber to flow over that which the rubber would have if subjected to the same conditions in the absence of the said softeners.

By the term "α-thienyl" we mean the heterocyclic radical represented by the formula:

Thus the formulas for the above plasticizers are:

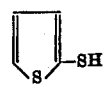 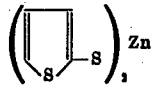

α-thienyl mercaptan   Zinc salt of α-thienyl mercaptan

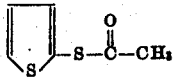 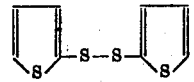

acetic ester of α-thienyl mercaptan as an example of the carboxylic acid esters     α,α'-dithienyl disulfide The mastication of the polymer may be carried out in the presence of the plasticizing agent in standard rubber processing equipment such as a Gordon plasticator, Banbury or Werner and Pfleiderer mixers or on a conventional rubber mill.

The additives may be used as such or may be diluted with non-reactive solvents without destroying the effectiveness of the agents. The degree of softening is dependent on the amount of agent employed and the time and temperature of milling. The preferred temperature is from 75° C. to 175° C. although both higher and lower temperatures may be used.

In order to more clearly illustrate our invention, preferred modes of carrying the same into effect, and advantageous results to be obtained thereby, the following examples are given:

EXAMPLE 1

75 grams of smoked sheet rubber was placed in a small Werner & Pfleiderer mixer and the charge mixed for ½ minute. The agent to be tested was then added in the quantity indicated in the following table and mixed with the rubber at the temperature and time indicated. The plasticized rubber so obtained was removed from the mixer and sheeted out on a rubber mill. Plasticity pellets were then cut from a sample of the plasticized polymer and the plasticity and recovery measured on a Williams parallel plate plastometer (cf. Williams, Ind. Eng. Chem., 16, 362 (1924)). Data obtained using α-thienyl mercaptan as the processing agent is recorded in Table I. Duplicate determinations are given under (1) and (2).

TABLE I

Williams' plasticity-recovery measurments

| Plasticizing Agent | Mixing Temp., °C. | Time in Min. | Percent Used | Plasticity | | Recovery | |
|---|---|---|---|---|---|---|---|
| | | | | (1) | (2) | (1) | (2) |
| None | 135–136 | 15 | None | 165 | 164 | 50 | 56 |
| α-Thienylmercaptan | 135–136 | 15 | 0.25 | 80 | 79 | −7 | −6 |
| Do | 135–136 | 15 | 1.00 | 70 | 71 | −7 | −4 |
| None | 158–160 | 15 | None | 153 | 149 | 57 | 50 |
| α-Thienylmercaptan | 158–160 | 15 | 0.25 | 89 | 90 | −5 | −5 |
| Do | 158–160 | 15 | 0.50 | 73 | 74 | −8 | −8 |
| Do | 158–160 | 15 | 1.00 | 67 | 70 | −9 | −7 |

The information listed in Table I shows that α-thienyl mercaptan is a very strong softening agent for rubber. This tremendous softening effect is beneficial in that it (1) Materially decreases the power consumption of the mill or mixer employed to masticate and compound the polymer.

(2) Decreases the time required for the incorporation of compounding agents.

(3) Produces stocks which extrude and mold better.

(4) Makes possible the production of superior vulcanizates since the oils, tars, bitumins etc., formerly employed as softening aids can be eliminated.

The tremendous softening effect produced by α-thienyl mercaptan is completely destroyed on vulcanization so that the vulcanizate produced is superior to that obtained by the addition of physical softeners even though the degree of softening is tremendously greater prior to curing.

EXAMPLE 2

Employing the same technique as described in Example 1 the zinc salt, acetic ester and disulfide of α-thienyl mercaptan were evaluated as plasticizing agents. The data obtained is listed in Table II. Duplicate determinations are given under (1) and (2).

TABLE II

Williams' plasticity-recovery measurments

| Plasticizing Agent | Mixing Temp., °C. | Time in Min. | Percent Used | Plasticity | | Recovery | |
|---|---|---|---|---|---|---|---|
| | | | | (1) | (2) | (1) | (2) |
| None | 158–160 | 15 | None | 153 | 149 | 57 | 50 |
| Zinc α-thienyl mercaptide | 158–160 | 15 | 0.25 | 84 | 85 | 0 | −2 |
| Do | 158–160 | 15 | 0.50 | 78 | 79 | 1 | −1 |
| Do | 158–160 | 15 | 1.00 | 55 | 60 | −1 | −3 |
| α,α'-Dithienyl disulfide | 158–160 | 15 | 0.25 | 110 | 112 | 12 | 10 |
| Do | 158–160 | 15 | 0.50 | 105 | 108 | 4 | 5 |
| Acetic ester of α-thienyl mercaptan | 158–160 | 15 | 0.50 | 56 | 53 | 0 | −2 |

EXAMPLE 3

75 parts of unmilled smoked sheets was placed in a small Werner & Pfleiderer mixer. 0.75 part of α-thienyl mercaptan was added and the charge mixed at 158–160° C. for 15 minutes. 20 parts of the resultant plasticized polymer was mixed with 180 parts of xylene until a smooth cement was formed. The Stormer viscosity of the smooth cement was measured at 25° C. and found to be 225 seconds. Data obtained using other compounds of this invention are recorded in Table III.

TABLE III

Stormer viscosity in seconds at 25° C.

| Plasticizing Agent | Mixing Temp., °C. | Time in Min. | Per Cent Used | Stormer Viscosity of 10 Per Cent Cements in Sec. at 25° C. |
|---|---|---|---|---|
| None | 158–160 | 15 | None | 4,600 |
| Zinc α-thienyl mercaptide | 158–160 | 15 | 0.25 | 980 |
| Do | 158–160 | 15 | 0.50 | 334 |
| Do | 158–160 | 15 | 1.0 | 110 |
| Acetic ester of α-thienyl mercaptan | 158–160 | 15 | 0.5 | 110 |
| α-Thienyl mercaptan | 158–160 | 15 | 0.5 | 478 |
| Do | 158–160 | 15 | 1.0 | 225 |

EXAMPLE 4

30 grams of unmilled smoked sheet rubber was placed on a 2 x 6" rubber mill, through which water at the indicated temperature was continually passed, and milled for one minute. 1% α-thienyl mercaptan was added and the milling continued for an additional 15 minutes. The placticized polymer was removed from the mill and tested for softness. Data obtained in this and other similar experiments are recorded in Table IV.

TABLE IV

*Mill plasticization of natural rubber*

| Plasticizing Agent [1] | Mill Temp., °C. | Williams Parallel Plate | | | |
|---|---|---|---|---|---|
| | | Plasticity | | Recovery | |
| | | (1) | (2) | (1) | (2) |
| None (Control) | 75 | 130 | ------ | 25 | ------ |
| Do | 100 | 179 | ------ | 65 | ------ |
| Do | 125 | 191 | ------ | 74 | ------ |
| α-Thienyl mercaptan | 75 | 94 | 91 | 1 | 3 |
| Do | 100 | 90 | 93 | 4 | 3 |
| Do | 125 | 84 | 88 | 5 | 3 |
| Zinc salt of α-thienyl mercaptan | 75 | 107 | 110 | 6 | 3 |
| Do | 100 | 112 | 120 | 7 | 9 |
| Do | 125 | 125 | 125 | 9 | 8 |
| Acetic ester of α-thienyl mercaptan | 75 | 92 | 92 | 4 | 4 |
| Do | 100 | 102 | 103 | 7 | 8 |
| Do | 125 | 82 | 95 | 4 | 4 |

[1] 1% of each agent was used except in the control.

Rubber cements of increased rubber content and decreased viscosity may be prepared by dissolving the rubber in any suitable solvent such as benzene, gasoline, carbontetrachloride, ethylene, dichloride and the like and treating the solution with α-thienyl mercaptan, its corresponding disulfide, its zinc salt, or its above named esters. The additive will act thereupon to reduce greatly the viscosity of the cement as shown in Example 3. It will generally be preferable either to treat the rubber with the agent to develop a soft product before dissolving the rubber in the solvent or to add the agent to the solvent before dissolving the rubber therein. By these last two methods it will be found that the solution of the rubber in the solvent will be greatly expedited and large amounts of rubber may be incorporated in the solvent to produce a cement of specified viscosity.

By the phrase "decreasing the resistance of rubber to flow" we mean to include decrease in the viscosity of the rubber solutions as well as increase in plasticity of ordinary unvulcanized rubber in a more or less solid state.

The plasticizing agents of this invention make possible the breakdown of rubber more completely and in a shorter time with an appreciable saving in power consumption and consequently a much greater output from each piece of equipment. The agents disperse well in rubber and not only soften rubber, but also improve the processing characteristics. In addition rubber plasticized with the materials of this invention dissolve more readily in organic solvents forming cements having a lower viscosity.

We claim as our invention:

1. The method of decreasing the resistance to flow of unvulcanized rubber comprising incorporating 0.05% to 5% by weight based on the unvulcanized rubber of a compound selected from the group consisting of unsubstituted α-thienyl mercaptan, its corresponding disulfide, its zinc salt, and its esters derived from carboxylic acids containing 1 to 8 carbon atoms.

2. The method of plasticizing unvulcanized rubber comprising incorporating 0.45% to 5% by weight based on the rubber of a compound selected from the group consisting of unsubstituted α-thienyl mercaptan, its corresponding disulfide, its zinc salt, and its esters derived from carboxylic acids containing 1 to 8 carbon atoms.

3. The method of decreasing the viscosity of rubber cement comprising incorporating 0.05% to 5% by weight based on the rubber of a compound selected from the group consisting of unsubstituted α-thienyl mercaptan, its corresponding disulfide, its zinc salt, and its esters derived from carboxylic acids containing 1 to 8 carbon atoms.

4. Unvulcanized rubber containing as a plasticizing agent 0.05% to 5% by weight based on the rubber of a compound selected from the group consisting of unsubstituted α-thienyl mercaptan, its corresponding disulfide, its zinc salt, and its esters derived from carboxylic acids containing 1 to 8 carbon atoms.

BERNARD MILLER STURGIS.
JOHN JOSEPH VERBANC.

REFERENCES CITED

The following references are of record in the file of this patent:

UNITED STATES PATENTS

| Number | Name | Date |
|---|---|---|
| 2,064,580 | Williams | Dec. 15, 1936 |
| 2,223,085 | Williams, et al. | Nov. 26, 1940 |
| 2,414,145 | Evans | Jan. 14, 1947 |

Certificate of Correction

Patent No. 2,504,903                                                          April 18, 1950

BERNARD MILLER STURGIS ET AL.

It is hereby certified that errors appear in the printed specification of the above numbered patent requiring correction as follows:

Column 1, line 16, for "plastice" read *plastic*; line 58, for "$\alpha,\alpha$-dithienyl" read *$\alpha,\alpha'$-dithienyl*; column 6, line 22, for "0.45%" read *0.05%*;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*